United States Patent
Gharib et al.

(10) Patent No.: US 9,869,136 B2
(45) Date of Patent: Jan. 16, 2018

(54) DRIVESHAFT CLAMPING ASSEMBLY

(71) Applicant: HALLIBURTON ENERGY SERVICES, INC., Houston, TX (US)

(72) Inventors: Hossam Mohamed Gharib, Edmonton (CA); John Keith Savage, Edmonton (CA); Steven Graham Bell, Red Deer (CA)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/115,507

(22) PCT Filed: Oct. 15, 2015

(86) PCT No.: PCT/US2015/055736
§ 371 (c)(1),
(2) Date: Jul. 29, 2016

(87) PCT Pub. No.: WO2017/065775
PCT Pub. Date: Apr. 20, 2017

(65) Prior Publication Data
US 2017/0260814 A1    Sep. 14, 2017

(51) Int. Cl.
*E21B 17/00*    (2006.01)
*F16C 3/02*    (2006.01)
(Continued)

(52) U.S. Cl.
CPC .............. *E21B 17/006* (2013.01); *F16C 3/02* (2013.01); *F16C 17/10* (2013.01); *E21B 4/02* (2013.01); *E21B 7/04* (2013.01); *F16C 2352/00* (2013.01)

(58) Field of Classification Search
CPC ........ F16C 17/06; F16C 17/065; F16C 17/10; F16C 2352/00; F16C 43/02; E21B 4/003
See application file for complete search history.

(56) References Cited

U.S. PATENT DOCUMENTS 4,199,201 A * 4/1980 Trzeciak ................. E21B 4/003
                                                                175/371
4,260,202 A    4/1981 Crase et al.
(Continued)

FOREIGN PATENT DOCUMENTS

WO        9615383        5/1996
WO        2010104915     9/2010
(Continued)

OTHER PUBLICATIONS

International Patent Application No. PCT/US2015/055736, International Search Report and Written Opinion, dated Jul. 13, 2016, 9 pages.

*Primary Examiner* — Phillip A Johnson
(74) *Attorney, Agent, or Firm* — Kilpatrick Townsend & Stockton LLP

(57) ABSTRACT

A clamping assembly may include a split-ring device and bearing for coupling to a driveshaft. The split-ring device may comprise split-ring shells having protrusions on an interior radial surface for positioning in grooves adjacent to radial protrusions on the driveshaft. In some aspects, the split-ring shells may include tabs corresponding to cavities on a first bearing for coupling the split-ring shell to the first bearing. In other aspects, the split-ring shells may be sized to create one or more gaps when positioned on the driveshaft. The first bearing may include one or more corresponding tabs for positioning in the one or more gaps created by the split-ring shells. A second bearing may be threadably coupled to the first bearing to suppress the axial and rotational movement of the clamping assembly separate from the driveshaft.

20 Claims, 14 Drawing Sheets

(51) Int. Cl.
*F16C 17/10* (2006.01)
*E21B 4/02* (2006.01)
*E21B 7/04* (2006.01)

(56) References Cited

U.S. PATENT DOCUMENTS

| | | | |
|---|---|---|---|
| 4,448,551 A * | 5/1984 | Murphy | E21B 4/003 |
| | | | 384/252 |
| 4,560,014 A | 12/1985 | Geczy | |
| 4,750,847 A | 6/1988 | Boyd et al. | |
| 5,228,787 A | 7/1993 | Lawson et al. | |
| 5,489,156 A | 2/1996 | Martinie et al. | |
| 5,746,517 A | 5/1998 | Durham et al. | |
| 5,984,024 A | 11/1999 | Strand | |
| 2007/0253657 A1 | 11/2007 | Casey et al. | |
| 2009/0016661 A1 | 1/2009 | Casey et al. | |
| 2012/0027334 A1 | 2/2012 | Putt et al. | |
| 2012/0285748 A1 * | 11/2012 | Kirkhope | E21B 4/003 |
| | | | 175/371 |
| 2013/0004105 A1 | 1/2013 | Wenzel et al. | |
| 2015/0368985 A1 * | 12/2015 | Eppink | E21B 3/00 |
| | | | 175/57 |

FOREIGN PATENT DOCUMENTS

| WO | 2012094460 | 7/2012 |
|---|---|---|
| WO | 2014126889 | 8/2014 |

* cited by examiner

DRIVESHAFT CLAMPING ASSEMBLY

CROSS-REFERENCE TO RELATED APPLICATIONS

This is a U.S. national phase under 35 U.S.C. 371 of International Patent Application No. PCT/US2015/055736, titled "Driveshaft Clamping Assembly" and filed Oct. 15, 2015, the entirety of which is incorporated herein by reference.

TECHNICAL FIELD

The present disclosure relates generally to mud motor driveshafts for use downhole and, more particularly (although not necessarily exclusively), to assemblies and methods for clamping one or more bearings to a driveshaft.

BACKGROUND

A mud motor or rotary steerable drilling tool may be used in directional drilling to control the curvature of a wellbore. The torque transmitted through a power section of the mud motor may drive a shaft of the mud motor having a drill bit at one end. Axial and lateral forces generated during a drilling operation of the mud motor may be resisted using a bearing assembly surrounding the driveshaft. The bearing assembly may include rotating components attached to the driveshaft.

A taper lock mechanism may be used to couple the bearings to the driveshaft. The taper lock mechanism may use a wedged insert to lock the axial and rotation movement of the rotating parts to the driveshaft. But, this mechanism may not be reliable during drilling operations as the axial loads generated during drilling may reach around 100,000 pounds. Similarly, a threaded connection may be used to mount the bearing assembly to the driveshaft. But, threads on the driveshaft may have several disadvantages, making them undesirable for mounting a bearing assembly to the driveshaft. For example, threadably coupling the bearings to the driveshaft may generate high stress concentrations to the driveshaft, increasing the likelihood of failure. Since the threads on the driveshaft may be prone to damage, they may require additional time and cost to extend the service life of the bearing assembly components and the driveshaft. In some instances, significant thread damage may require replacement of an expensive driveshaft. Further, threading on the driveshaft may require increased third-party inspection, which may result in lost time and money due to additional cleaning done prior to inspection and the downtime of the drilling operations during the inspections.

DETAILED DESCRIPTION

Certain aspects and examples of the present disclosure relate to a clamping assembly for mounting one or more devices on a driveshaft of a drilling assembly without the use of threading on the driveshaft. For example, the clamping assembly may include a split-ring device having two or more split-ring shells for mounting driveshaft bearings or other drilling components to a driveshaft and suppressing the axial and rotational movement of the drilling components separate from the movement of the driveshaft. The driveshaft may include radial protrusions and grooves on an outer surface to locate the split-ring device on the driveshaft. The split-ring device may include protrusions on an interior surface to engage the radial protrusions and grooves of the driveshaft. In some aspects, the clamping assembly may include an on-bottom thrust bearing and an off-bottom thrust bearing mounted to the driveshaft for receiving axial loads during on-bottom and off-bottom operations, respectively. During on-bottom operations a drill bit may be engaged with a surface of a wellbore (e.g., the bottom of the wellbore) and a weight may be applied to the driveshaft for operating the drill bit. During off-bottom operations there may be instances where there is no weight applied to the drill bit. The drill string may be pulled upward and the weight and operation of the drill bit may apply a load on the driveshaft. In at least one aspect, the off-bottom thrust bearing may include one or more axial cavities to mate with tabs on the split-ring device. In another aspect, the off-bottom thrust bearing may include one or more axial protrusions to mate with one or more gaps between the split-ring shells of the split-ring device. Coupling the off-bottom thrust bearing to the split-ring device may suppress or prevent motion of the off-bottom thrust bearing. The off-bottom thrust bearing may further be threadably coupled to an on-bottom thrust bearing to clamp the off-bottom thrust bearing, the on-bottom thrust bearing, and the split-ring device to the driveshaft.

A clamping assembly according to some aspects of the present disclosure may reduce the threading necessary for coupling drilling components to the driveshaft. Reduced threading may result in a savings of time and money by eliminating cleaning, chasing, inspecting, and torque-logging repair and maintenance activities. Further, additional cost and time savings may be realized by extending the operational life of the driveshaft due to eliminating the stress caused by the threaded components.

The terms "inner," "outer," "internal," "external," "interior," and "exterior," as used in the present disclosure may refer to a radial orientation toward or away from the center of the mud motor drilling assembly. The term "adjacent" as used in the present disclosure may refer to an axial orientation toward or away from the surface.

Figure 1:
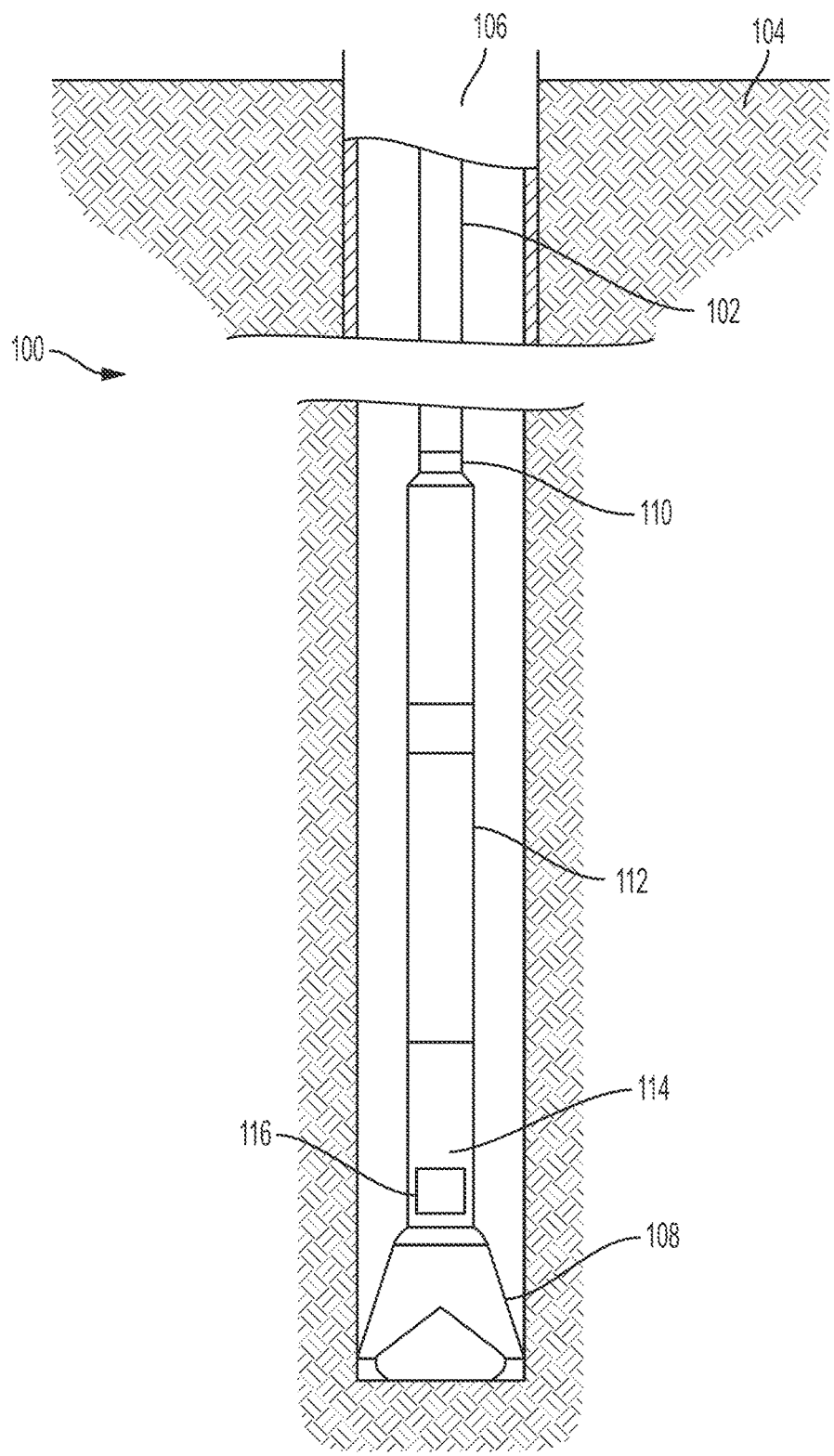
FIG. 1 is a cross-sectional schematic diagram depicting a drilling system that includes a clamping assembly according to one aspect of the present disclosure.

Various aspects of the present disclosure may be implemented in various drilling systems. FIG. 1 illustrates an example of such a drilling system 100 that includes a drill string 102. The drill string 102 of a drilling rig (not shown) may include segmented pipes that may extend below the surface 104 in a borehole, such as a wellbore 106. The drill string 102 may transmit drilling fluid (or mud) and the torque necessary to operate a drill bit 108. Also, the weight of the drill string 102 may provide an axial force on the drill bit 108. The drill string 102 may include a drill pipe 110 and a bottom hole assembly 112. The bottom hole assembly 112 may be include various components, such as a downhole motor assembly 114 and the drill bit 108. The functional block in FIG. 1 may represent a placement of a clamping assembly 116 in the downhole motor assembly 114 according to at least one example. In other examples, however, the clamping assembly may be positioned elsewhere in the drilling system.

Figure 2:
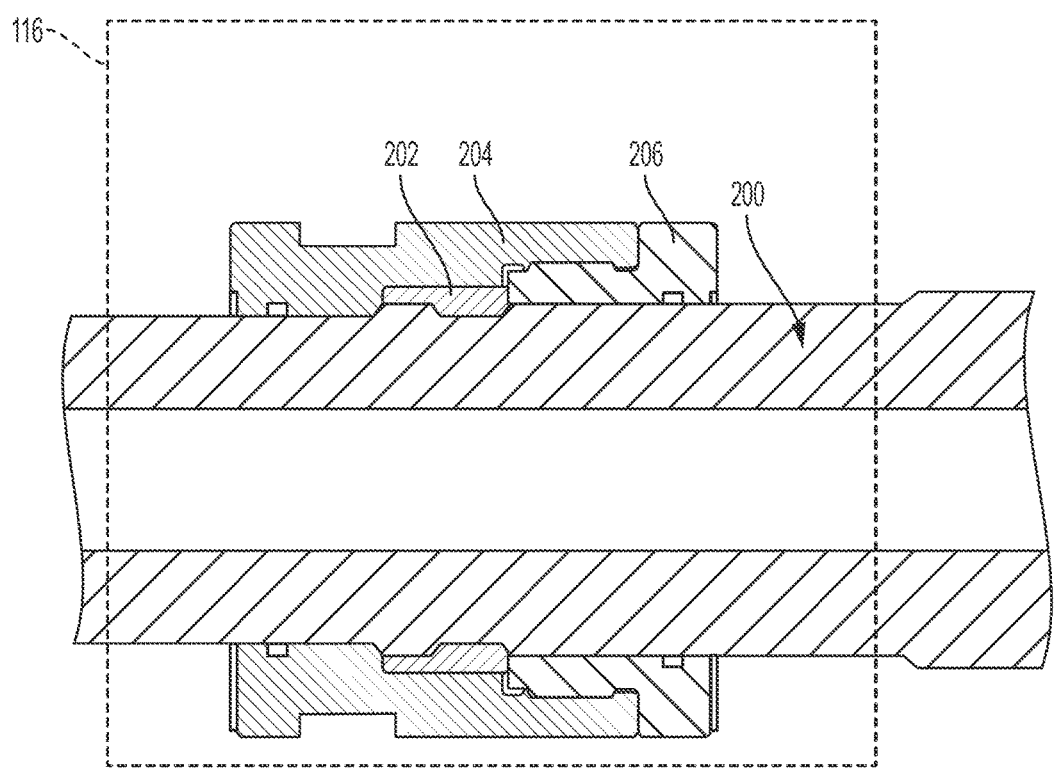
FIG. 2 is a cross-sectional view of a clamping assembly according to one aspect of the present disclosure.

FIG. 2 shows a cross-sectional view of the clamping assembly 116 that may be positioned in the downhole motor assembly 114 of the drilling system 100 of FIG. 1. The clamping assembly 116 may be coupled to a driveshaft 200. In some aspects, the driveshaft 200 may be coupled to a power section of a mud motor of the drilling system 100 of FIG. 1. The driveshaft 200 may transmit torque from the power section to a drill bit (e.g., the drill bit 108 of FIG. 1) coupled to a downhole end of the driveshaft 200. The driveshaft 200 may include a rigid material sufficient to withstand torsion, shear stress, or other loads during operation of the drilling system 100 (e.g., steel, etc.). The clamping assembly 116 may include a split-ring device 202 positionable on the driveshaft 200 as shown in FIG. 2. In some aspects, the split-ring device 202 may include two or more split-ring shells that are shaped to encircle the driveshaft 200. The clamping assembly 116 also includes bearings 204, 206. The split-ring device 202 may be positioned on the driveshaft 200 to prevent axial and rotational movement of the bearings 204, 206 or other components clamped to the driveshaft 200. The bearings 204, 206 may be shaped to correspond to the shape of the driveshaft 200. For example, bearings 204, 206 may include a circular cross-section corresponding to a circular cross-section of the driveshaft 200 to allow the bearings 204, 206 to slide onto an external surface of the driveshaft 200.

In some aspects, bearing 204 may include an on-bottom thrust bearing. The on-bottom thrust bearing may be positioned on the driveshaft 200 to receive an axial load from the driveshaft 200 during on-bottom operations of the drilling system 100. In some examples, on-bottom operations may include operations where the drill bit 108 is engaged with a surface of the wellbore 106 (e.g., the bottom of the wellbore 106) and a weight is applied to the driveshaft 200 for operating the drill bit 108. In some aspects, bearing 206 may include an off-bottom bearing. The off-bottom thrust bearing may be positioned on the driveshaft 200 to receive an axial load from the driveshaft during off-bottom operations. Off-bottom operations may include operations where there is no weight applied to the drill bit 108 (e.g., weight on bit). In some examples, the drill string 102 may be pulled upward and the weight and operation of the drill bit 108 may apply a load on the driveshaft 200.

Figure 3:
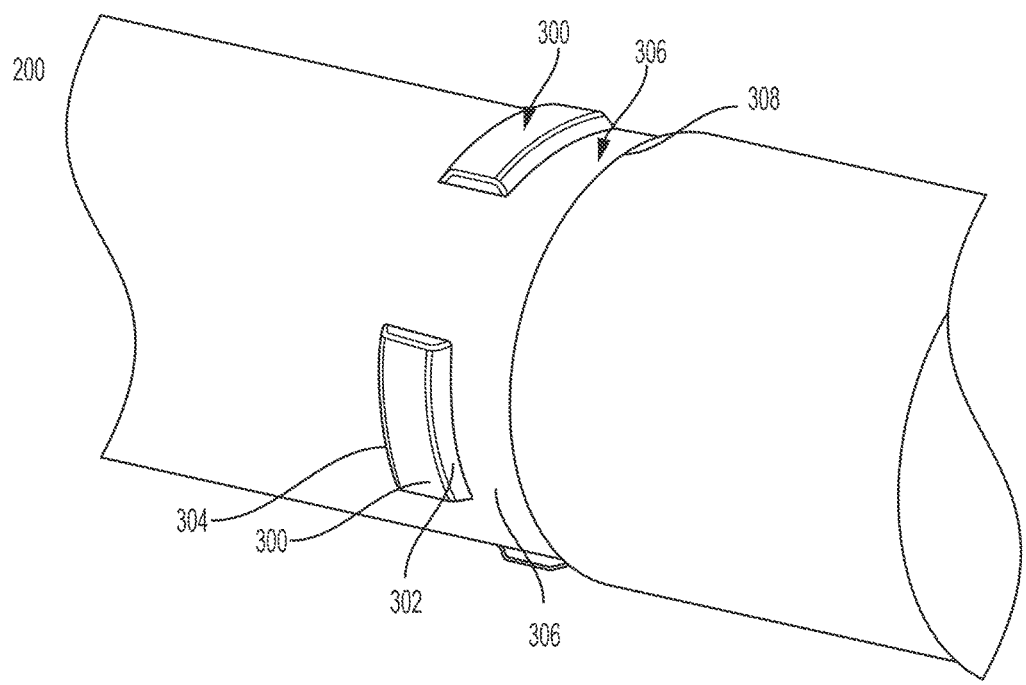
FIG. 3 is a perspective view of a driveshaft according to one aspect of the present disclosure.

FIG. 3 shows a perspective view of an example of the driveshaft 200 according to some aspects of the present disclosure. The driveshaft 200 may include radial protrusions 300 on an external surface of the driveshaft 200. The radial protrusions 300 may include edges 302, 304 that extend radially from the external surface of the driveshaft 200. The radial protrusions 300 create grooves 306 in the driveshaft 200 between the edge 302 of the radial protrusions 300 and a shoulder 308 of the driveshaft 200. In some aspects, the shoulder 308 of the driveshaft 200 may include an outer diameter greater than the outer diameter of the grooves 306. The radial protrusions 300 and grooves 306 may be positioned on the external surface of the driveshaft 200 to locate the split-ring device 202 of FIG. 2 to the driveshaft 200.

Figure 4:
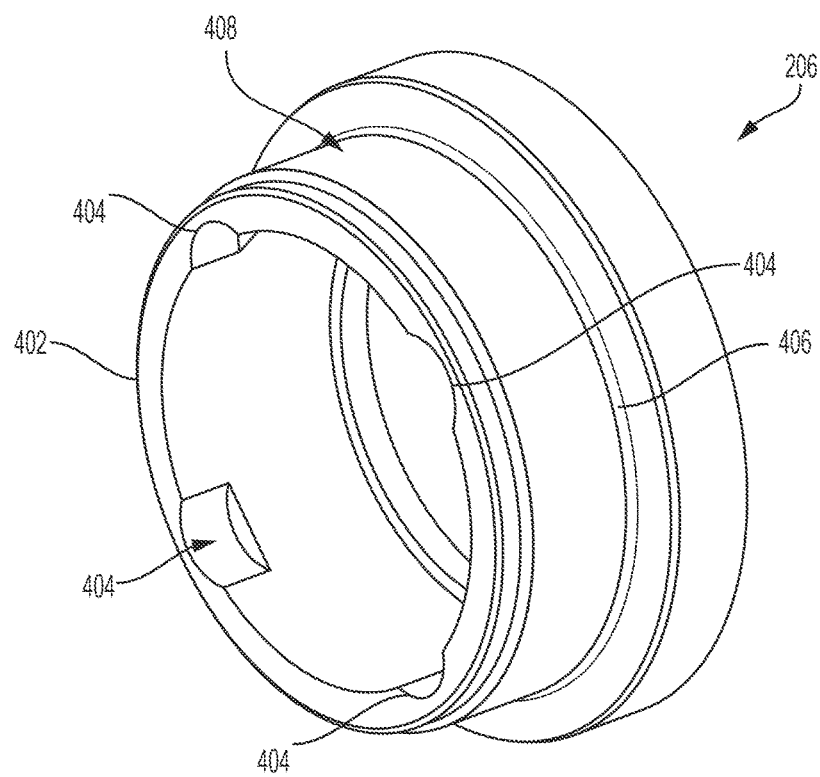
FIG. 4 is a perspective view of an example of a driveshaft bearing that may be included in a clamping assembly according to one aspect of the present disclosure.
Figure 5:
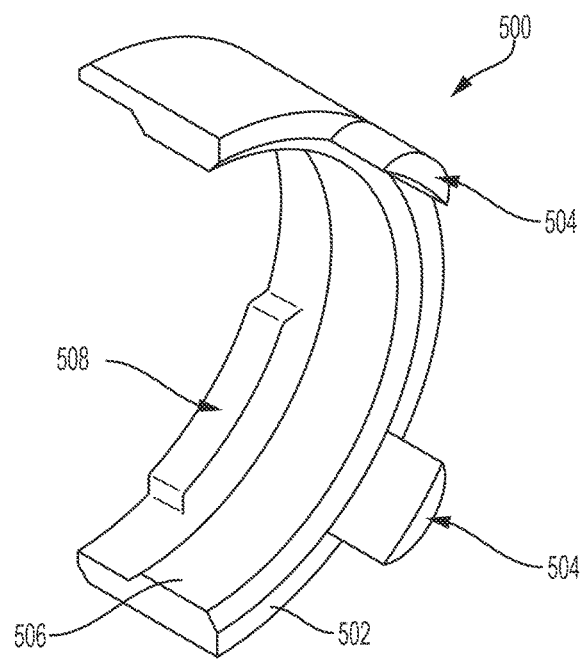
FIG. 5 is a perspective view of an example of a split-ring shell of a split-ring device that may be included in a clamping assembly according to one aspect of the present disclosure.

FIGS. 4 and 5 show a perspective view of an example of the bearing 206 and a split-ring shell 500 of the split-ring device 202, respectively, that may be included in the clamping assembly 116 shown in FIG. 2. In FIG. 4, the bearing 206 includes an axial end 402 with cavities 404. The cavities 404 may be grooved into the axial end 402 of the bearing 206 for engaging a portion of the split-ring shell 500. In some aspects, the bearing 206 may include an off-bottom thrust bearing. Although four cavities 404 are shown in FIG. 4, the bearing 206 may include any number of cavities 404, including one. The bearing 206 may also include an exterior radial surface 406 having threading 408. The threading 408 may be male or female threading corresponding to opposing threading on a second bearing of the clamping assembly 116 (e.g., bearing 204 of FIG. 2). The threading 408 may be positioned on the exterior radial surface 406 of the bearing 206 to engage the opposing threading on the second bearing (e.g., a second bearing having opposing threading on an internal surface). Although the threading 408 is shown on the exterior radial surface 406, the threading 408 may be positioned on other surfaces of the bearing 206 for engaging the second bearing. For example, the threading 408 may be positioned on an internal portion of the bearing 206 for engaging opposing threading on an external surface of a second bearing 206.

In FIG. 5, the split-ring shell 500 include an axial end 502 having one or more tabs 504. The tabs 504 may be shaped and positioned to engage the cavities 404 of the bearing 206 shown in FIG. 4. In some aspects, the split-ring device 202 may include one or more split-ring shells 500 that together form a full or partial ring. For example, the split-ring shell 500 shown in FIG. 5 includes a half-circle cross-section such that two may form a full circular ring. The split-ring device 202 may include two split-ring shells 500 together having four tabs 504 (two tabs 504 on each split-ring shell 500) with a corresponding semi-circular shape for engaging the cavities 404 of the bearing 206 of FIG. 4. The split-ring shell 500 also includes an interior radial surface 506 having a protrusion 508. The protrusion 508 may allow the split-ring device 202 to engage the driveshaft 200. For example, the protrusion 508 may be shaped and positioned to be received in a groove 306 of the driveshaft 200 shown in FIG. 3. Although only one protrusion 508 is shown on the split-ring shell 500, the split-ring shell 500 may have any number of protrusions 508 such that the total number of protrusions 508 on the split-ring device 202 corresponds to the number of grooves 306 on the driveshaft 200.

Figure 6:
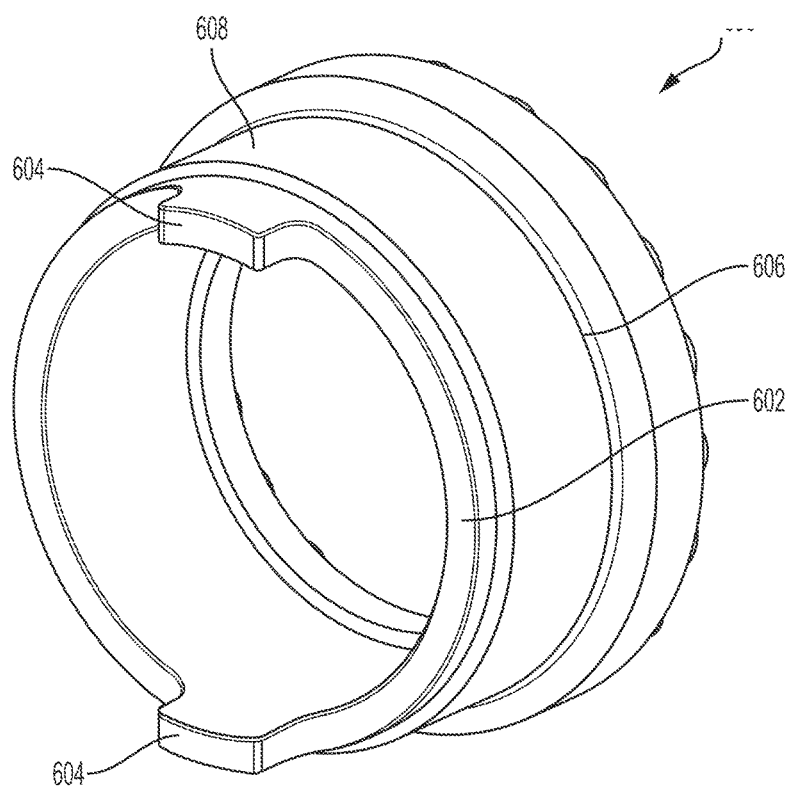
FIG. 6 is a perspective view of another example of a driveshaft bearing that may be included a clamping assembly according to one aspect of the present disclosure.
Figure 7:
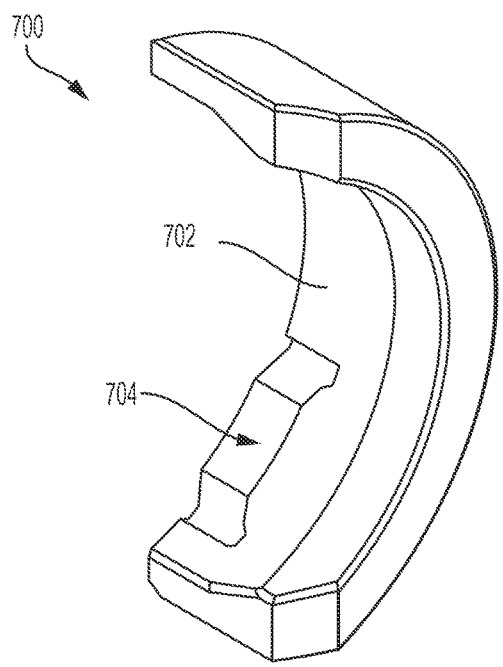
FIG. 7 is a perspective view of another example of a split-ring shell of a split-ring device that may be included in a clamping assembly according to one aspect of the present disclosure.

FIGS. 6 and 7 show a perspective view of another example of a bearing 600 and split-ring shell 700, respectively. In some aspects, the bearing 600 may replace bearing 206 in the clamping assembly 116 and split-ring shell 700 may replace split-ring shell 500 in the split-ring device 202 shown in FIG. 2. In some aspects, the bearing 600 may be similar in design and function to the bearing 206, but may include an axial end 602 having tabs 604 for engaging the split-ring device 202 of the clamping assembly 116. In some aspects, bearing 600 may include an off-bottom thrust bearing. Similar to the bearing 206, the bearing 600 may also include an exterior radial surface 606 that includes threading for engaging with opposing threading on an internal surface of a second bearing (e.g., bearing 204 of FIG. 2). In some aspects, the bearing 600 may engage the split-ring shell 700 of FIG. 7 that may be included in the split-ring device 202. The split-ring shell 700 may include a partially-circular cross-sectional. In some aspects, the split-ring shell 700 may be sized to join with another split-ring shell 700 to form a ring encircling the driveshaft 200, but leaving one or more gaps between the split-ring shells 700. The gaps may be sized to receive the tabs 604 of the bearing 600.

Figure 8:
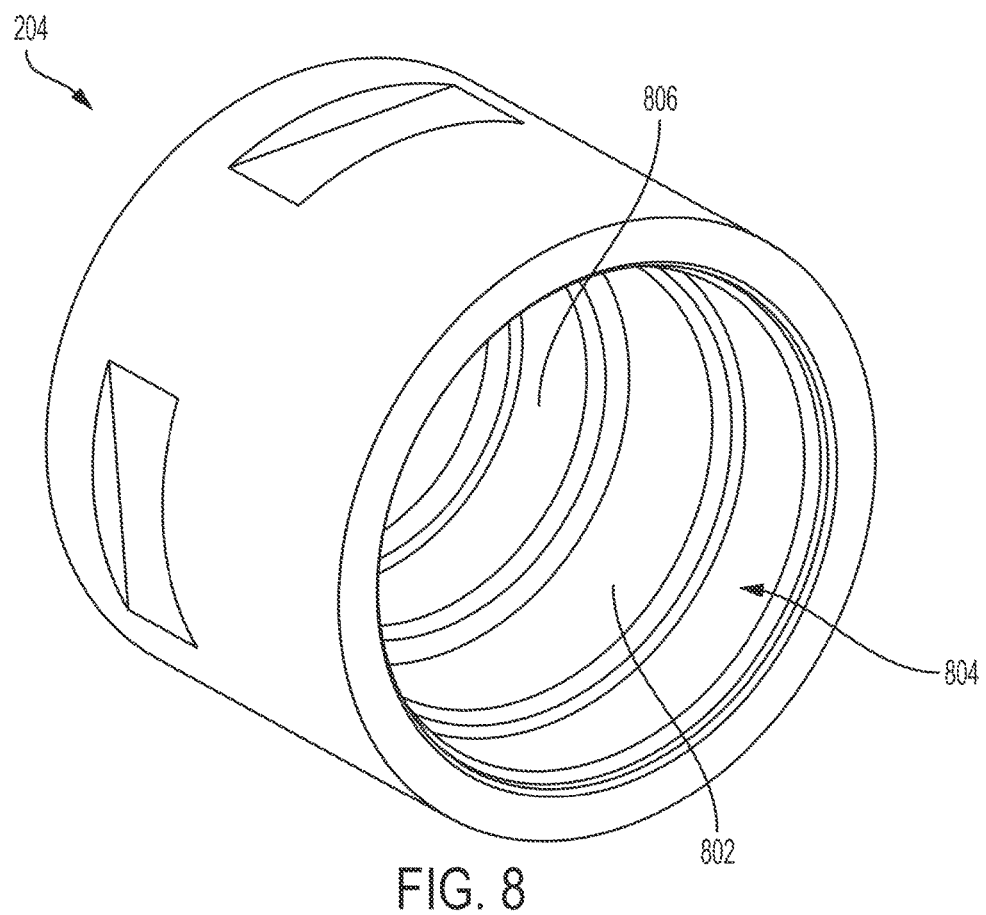
FIG. 8 is a perspective view of an example of another driveshaft bearing that may be included in a clamping assembly according to one aspect of the present disclosure.

FIG. 8 shows an example of the bearing 204 that may be included in the clamping assembly 116. In some aspects, the bearing 204 may include an on-bottom thrust bearing for engaging with an off-bottom thrust bearing. The bearing 204 includes an interior radial surface 802 having threading 804. The threading 804 may correspond to threading on another bearing (e.g., bearing 206 of FIG. 4) to couple the bearing 204 to the other bearing. Although the threading 804 is shown on the interior radial surface 802 of the bearing 204 in FIG. 8, the threading may be positioned on other portions of the bearing 204 to mate with corresponding threading on another bearing without departing from the scope of the present disclosure. For example, the threading 804 may alternatively be positioned on an exterior radial surface of the bearing 204 to engage with another bearing having opposing threading on an interior radial surface. The bearing 204 may also include a taper 806 on its interior radial surface. The inclination of the taper 806 may correspond to an inclination of the edge 304 of the radial protrusions 300 on the driveshaft 200 shown in FIG. 3. In some aspects, the taper 806 may be positioned against the edge 304 of the radial protrusions 300 to provide a path for an axial load transmitted from the driveshaft 200 to the bearing 204.

Figure 9:
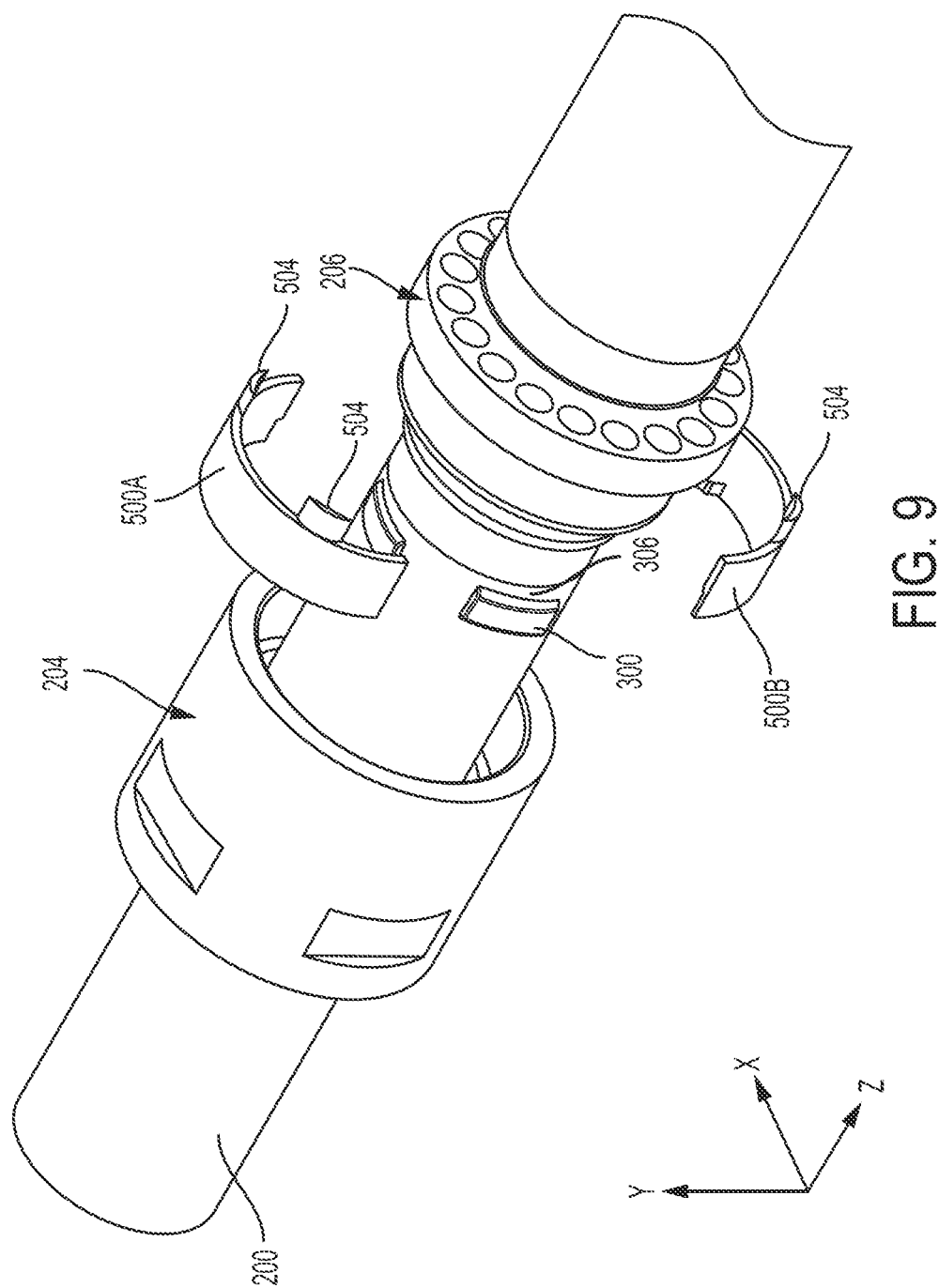
FIG. 9 is a perspective view of an example of a partially assembled clamping assembly including the driveshaft bearing of FIG. 4 positioned on a driveshaft according to one aspect of the present disclosure.
Figure 10:
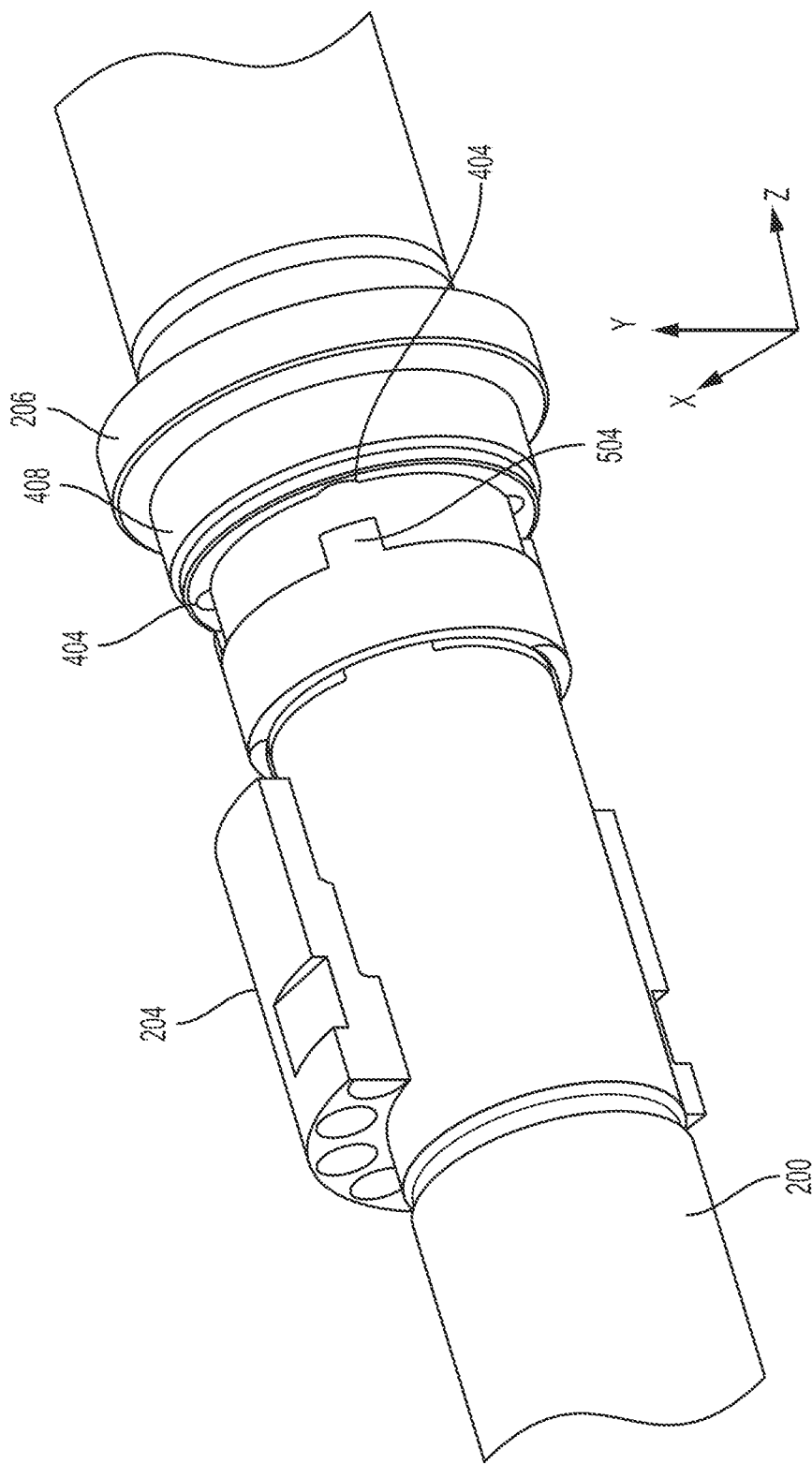
FIG. 10 is a partial cross-sectional view of an example of the partially assembled clamping assembly of FIG. 7 including the split-ring device of FIG. 5 assembled on the driveshaft according to one aspect of the present disclosure.
Figure 11:
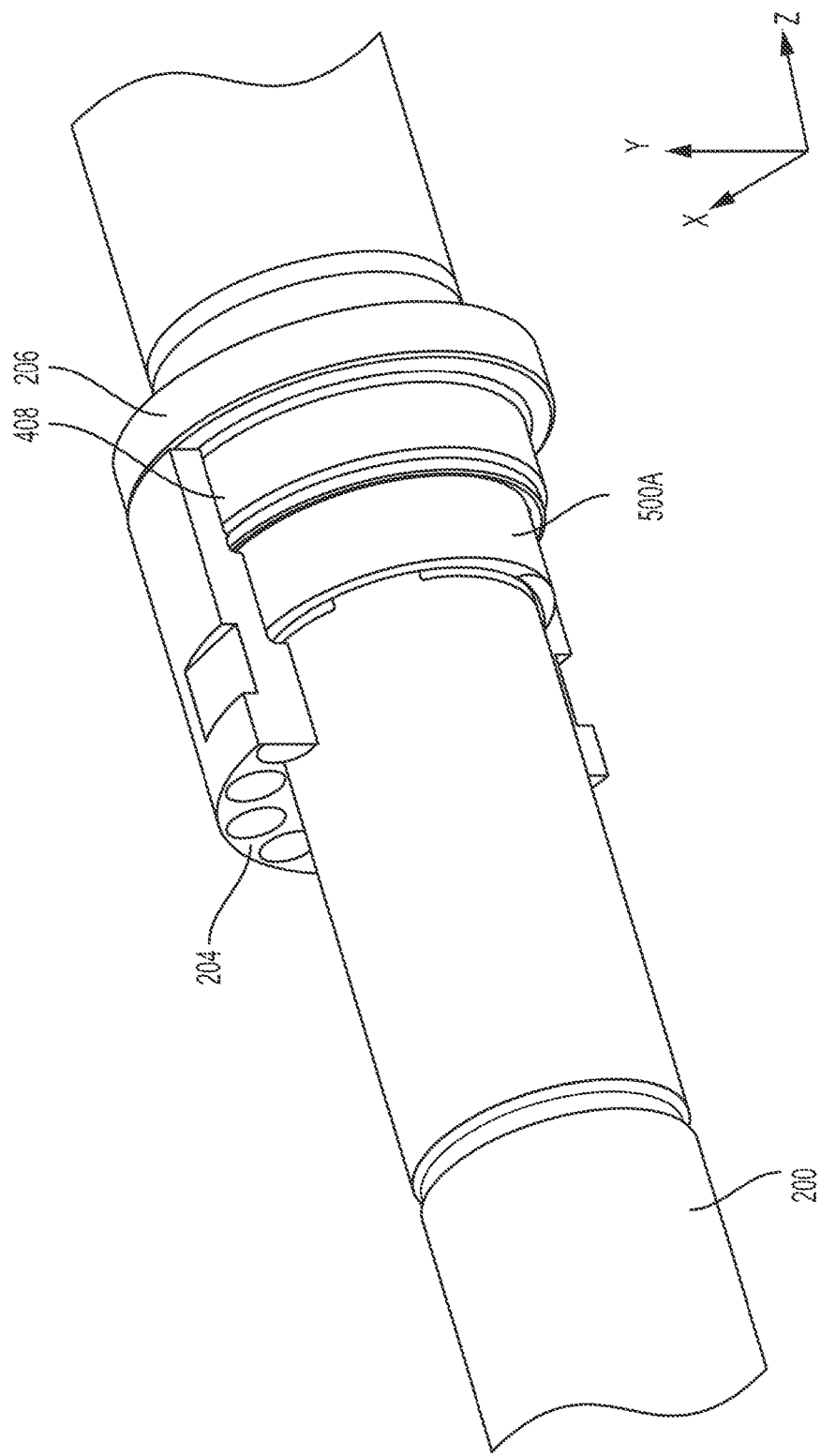
FIG. 11 is a partial cross-sectional view of the clamping assembly of FIGS. 9 and 10 assembled according to one aspect of the present disclosure.

FIGS. 9-11 are schematic views of the clamping assembly 116 shown in FIG. 2 to illustrate a process for installing the bearings 204, 206 on the driveshaft 200 using the split-ring device 202 having the split-ring shells 500A, 500B shown in FIG. 5.

In FIG. 9, the bearings 204, 206 and the split-ring device 202 having two split-ring shells 500 are provided for positioning on the driveshaft 200. The bearing 206 may be positioned on the driveshaft 200 proximate to the radial protrusions 300 and the grooves 306. In some aspects, the bearing 206 may be positioned on the driveshaft 200 by sliding the bearing 206 across the external surface of the driveshaft 200. In some aspects, the bearing 206 may include an inner diameter greater than the outer diameter of the driveshaft 200 to allow the bearing 206 to be positioned on the driveshaft 200. The inner diameter of the bearing 206 may also be greater than the outer diameter of the radial protrusions 300 on the driveshaft to allow the bearing 206 to pass over the radial protrusions 300 as the bearing 206 is slidably positioned on the driveshaft 200 proximate to the radial protrusions 300. In some aspects, the bearing may be loosely fitted on the driveshaft 200 proximate to the radial protrusions 300 preceding the positioning of the split-ring shells 500A, 500B on the driveshaft 200. The bearings 204, 206 include a circular cross-section. The circular cross-section of the bearings 204, 206 correspond to the circular cross-section of the driveshaft 200 to allow the bearings 204, 206 to be received by and mounted on the driveshaft 200. Although the bearings 204, 206 include a circular cross-section as shown in FIG. 9, the bearings 204, 206 may include any cross-sectional shape corresponding to the shape of the driveshaft 200.

The protrusions 508 of each of the split-ring shells 500A, 500B shown in FIG. 5 may be positioned in the corresponding grooves 306 of the driveshaft 200. In some aspects, the radial protrusions 300 and the grooves 306 of the driveshaft 200 may prevent the split-ring shells 500A, 500B of the split-ring device 202 from axial and rotational movement separate from the driveshaft 200 when the protrusions 508 of the split-ring shells 500A, 500B are positioned in the grooves 306. In other words, the split-ring device 202 may be locked onto the driveshaft 200 such that any movement of the split-ring device 202 is in concert with the driveshaft 200. The split-ring shells 500A, 500B of the split-ring device 202 may be positioned on the driveshaft 200 as shown in FIG. 10. The split-ring shells 500A, 500B may form a ring encircling the driveshaft 200.

The bearing 206 may be rotated on the driveshaft 200 as necessary to align the cavities 404 of the bearing 206 with the tabs 504 of the split-ring shells 500A, 500B. The bearing 206 may be slid toward the split-ring shells 500A, 500B until the tabs 504 of the split-ring shells 500A, 500B are positioned in the cavities 404 of the bearing 206 as shown in FIG. 10. As rotational and axial movement of the split-ring device 202 is prevented by the radial protrusions 300 and the grooves 306 of the driveshaft 200, coupling the bearing 206 to the split-ring shells 500A, 500B may prevent rotational and axial movement of the bearing 206 separate from the split-ring device 202 and the driveshaft 200. The bearing 204 may be torqued to the bearing 206 by sliding the bearing 204 along the driveshaft 200 toward the bearing 206 and mating or otherwise engaging the threading 804 on the interior radial surface of the bearing 204 shown in FIG. 8 with the threading 408 on the bearing 206 to clamp the bearings 204, 206 to the driveshaft 200. Torquing the bearing 204 to the bearing 206 may prevent the axial and rotational movement of the bearing 204 separate from the driveshaft 200. As the driveshaft 200 operates, the bearings 204, 206 and the split-ring device 202 may rotate or otherwise move in concert with the movement of the driveshaft 200.

Figure 12:
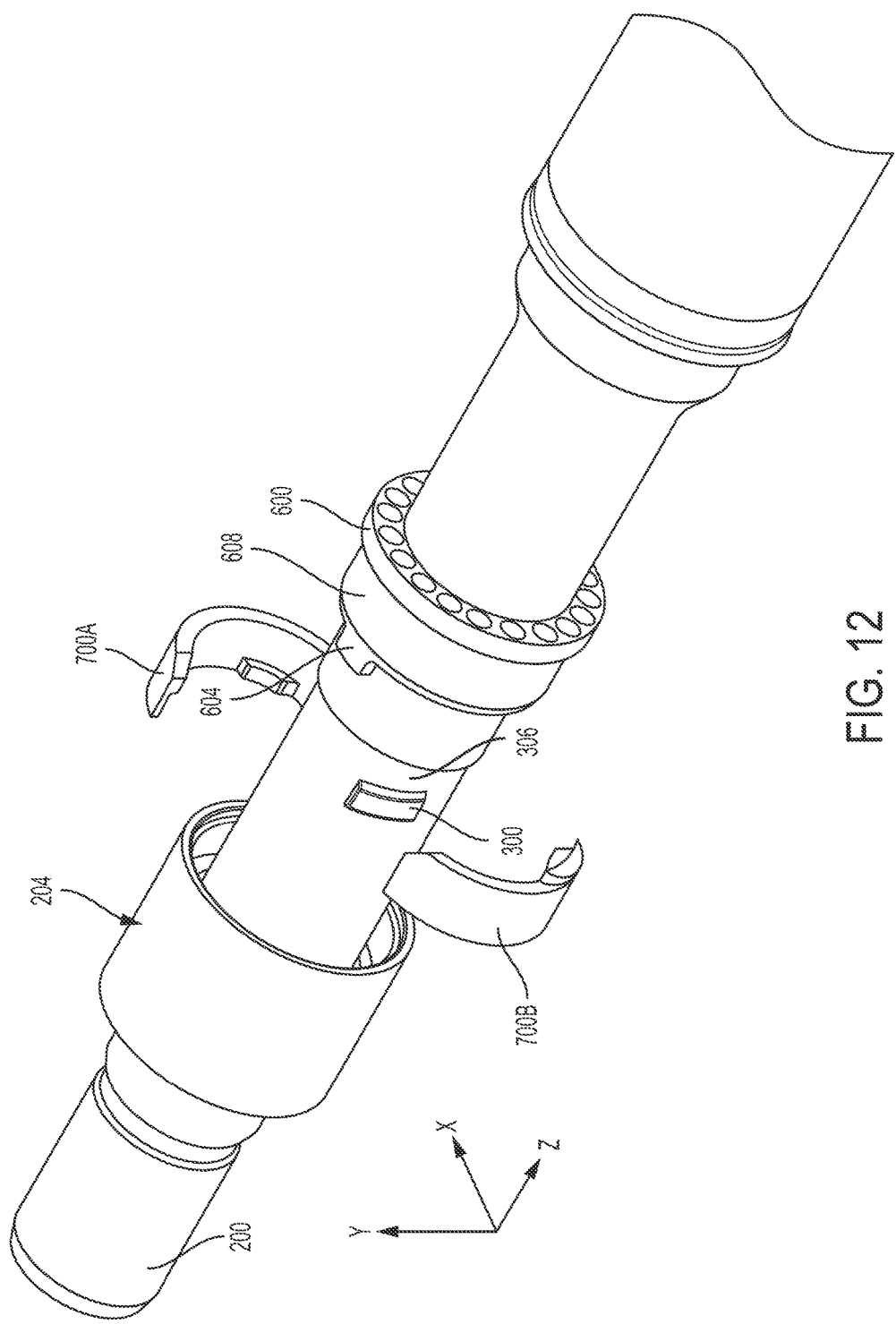
FIG. 12 is a perspective view of an example of a partially assembled clamping assembly including the driveshaft bearing of FIG. 6 positioned on a driveshaft according to one aspect of the present disclosure.
Figure 13:
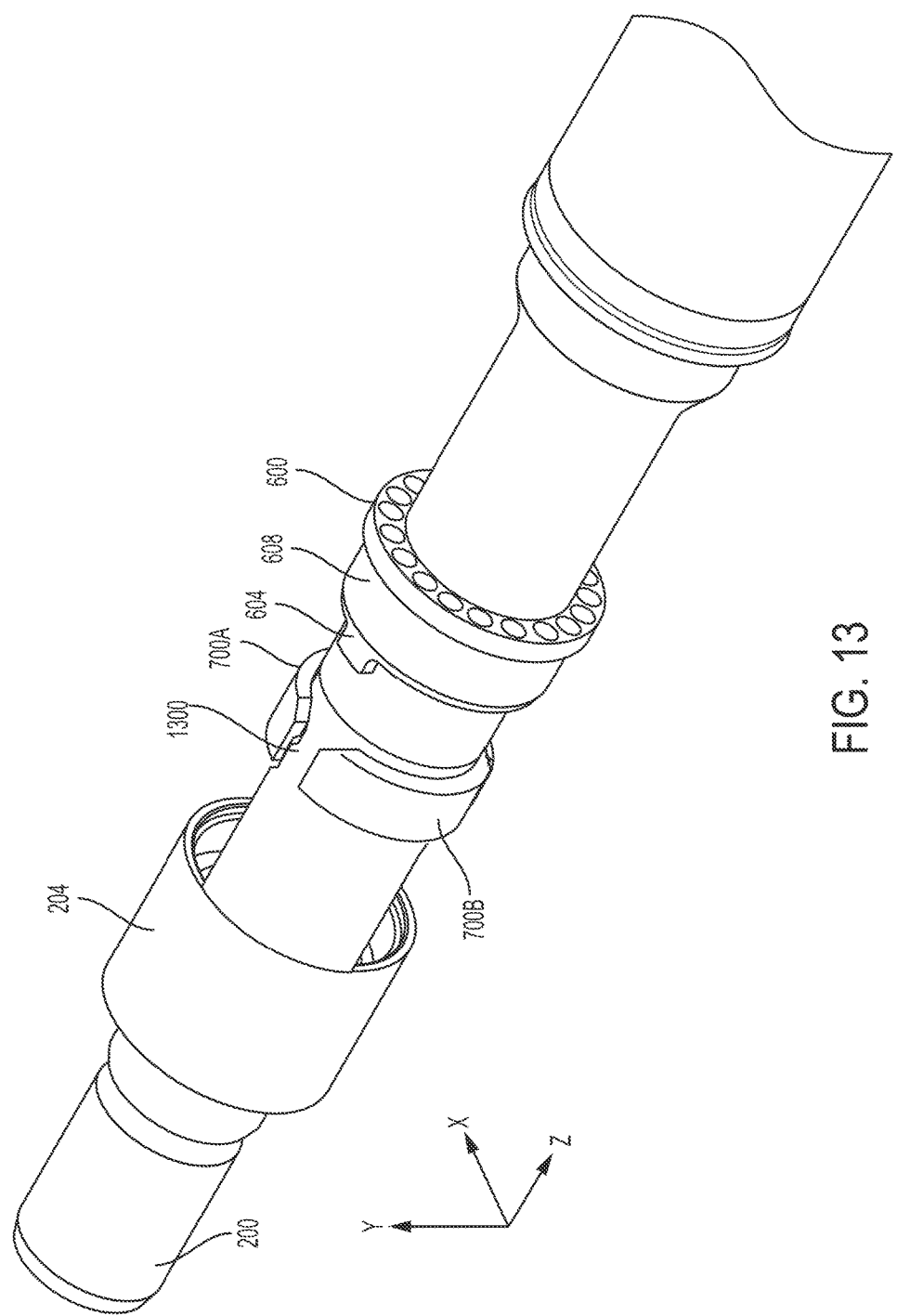
FIG. 13 is a perspective view of an example of the partially assembled clamping assembly of FIG. 12 including the split-ring device of FIG. 7 assembled on the driveshaft according to one aspect of the present disclosure.

Although the process is illustrated and described using bearings 204, 206, and split-ring shells 500A, 500B, the process may be implemented in various ways using various bearings or other driveshaft components (e.g., a driveshaft sleeve, a catch assembly, sensors, etc.) and a split-ring device 202 without departing from the scope of the present disclosure. For example, FIGS. 12-15 show a process for installing the bearings 204, 600 on the driveshaft 200 using the split-ring device 202 having the split-ring shells 700A, 700B of FIG. 7. In FIG. 12, the bearings 204, 600 and the split-ring device 202 having two split-ring shells 700A, 700B are provided for positioning on the driveshaft 200. The bearing 600 may be positioned on the driveshaft 200 proximate to the radial protrusions 300 and the grooves 306. In some aspects, the bearing 600 may be positioned on the driveshaft 200 by sliding the bearing 600 across the external surface of the driveshaft 200. In additional and alternative aspects, the bearing 600 may be sized to allow the bearing 600 to pass over the radial protrusions 300 for positioning on the driveshaft 200. The split-ring shells 700A, 700B of the split-ring device 202 may be positioned on the driveshaft 200 as shown in FIG. 13.

Figure 14:
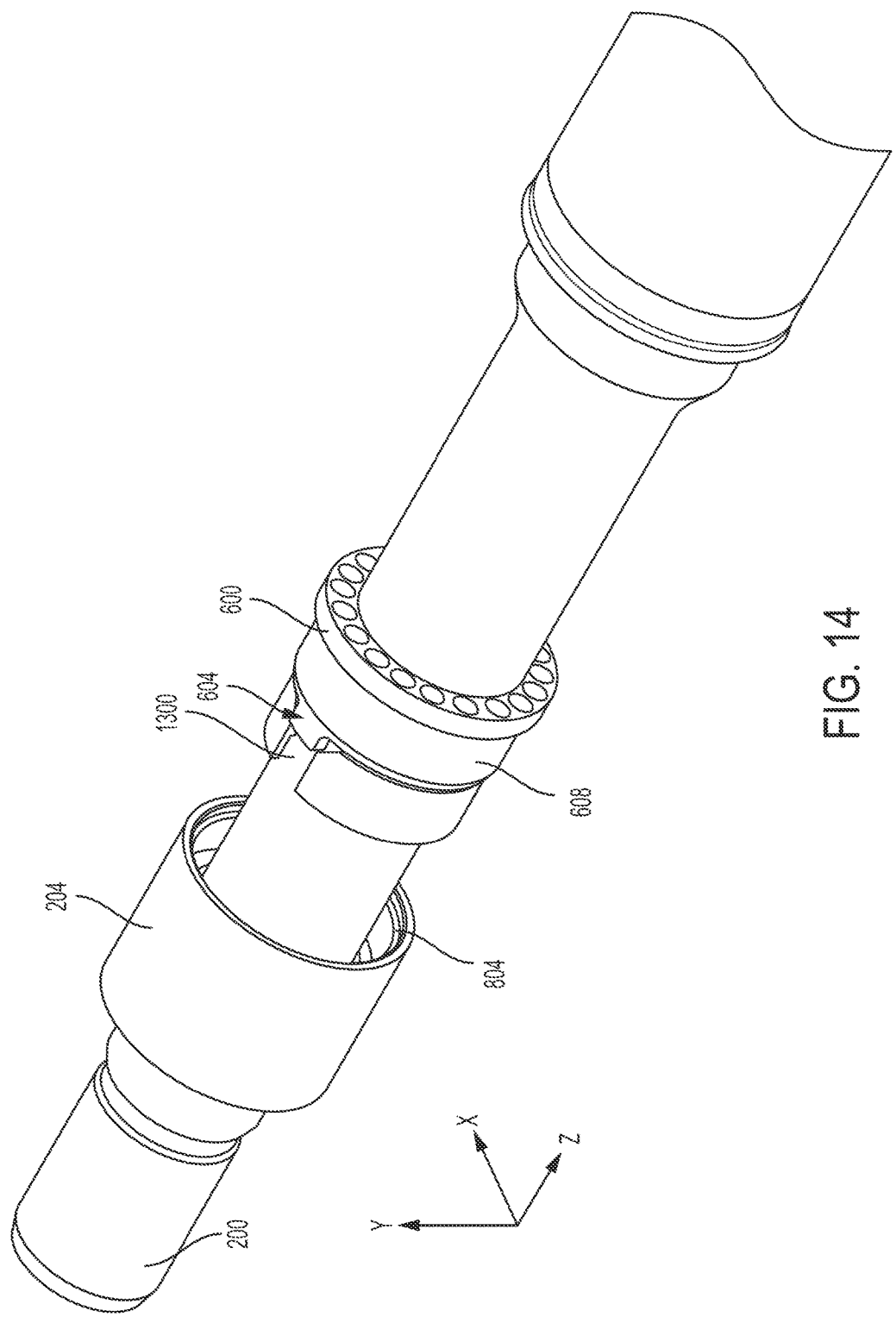
FIG. 14 is a perspective view of an example of the partially assembled clamping assembly of FIG. 12 including the driveshaft bearing of FIG. 6 assembled on a driveshaft according to one aspect of the present disclosure
Figure 15:
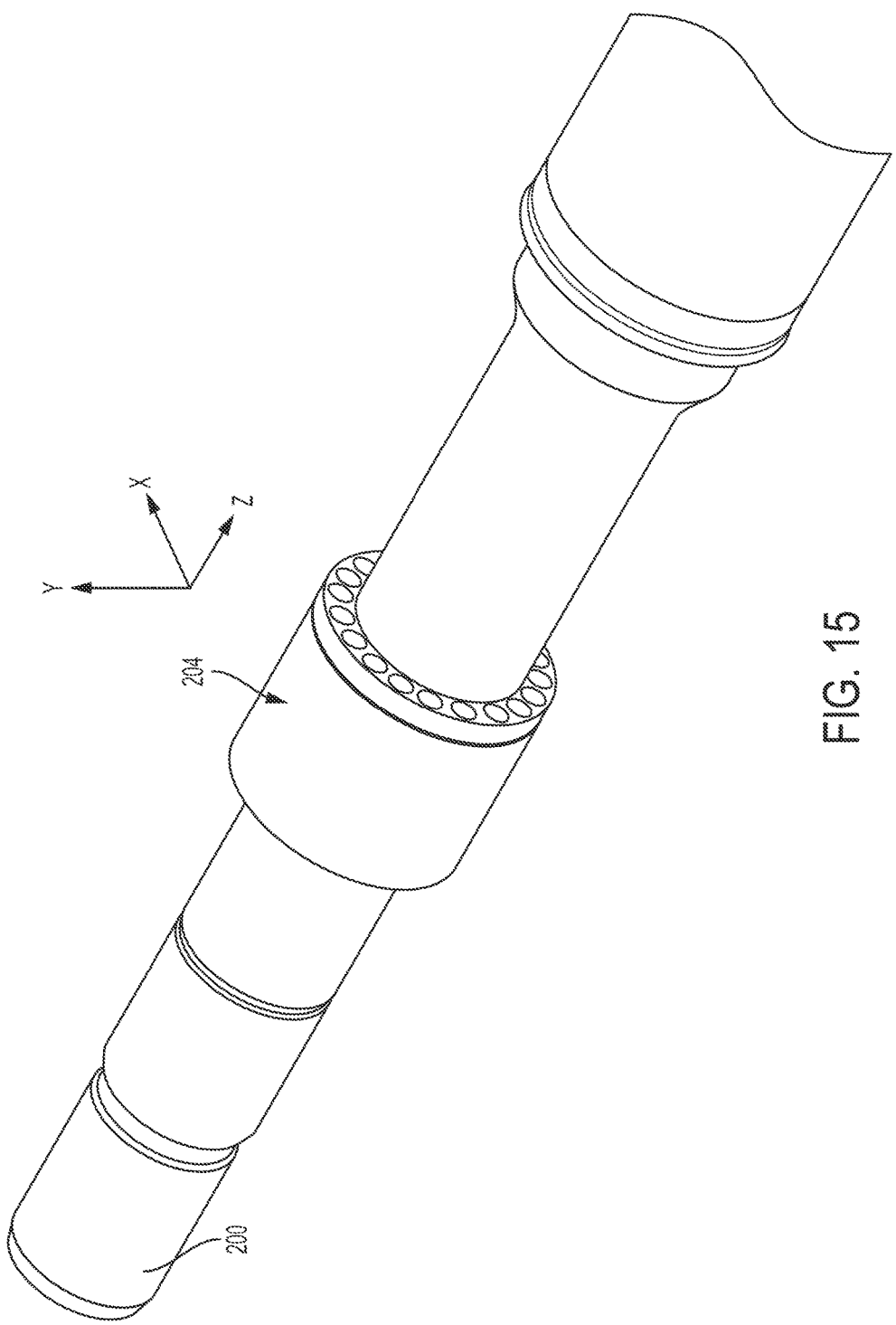
FIG. 15 is a perspective view of an example of the clamping assembly of FIGS. 12-14 assembled according to one aspect of the present disclosure.

The split-ring shells 700 may be positioned to create a gap 1300 between the split-ring shells 700A, 700B. Although only one gap 1300 is shown between the split-ring shells 700A, 700B in FIG. 13, any number of gaps 1300 may be included between the split-ring shells 700A, 700B. For example, an additional gap may be created between the opposing ends of the split-ring shells 700A, 700B on the side of the driveshaft 200 not shown in FIG. 13. The gaps 1300 between the split-ring shells 700A, 700B may be sized to receive the tabs 604 on the bearing 600 to prevent axial and rotational movement of the bearing 600 separate from the split-ring shells 700A, 700B and the driveshaft 200. The bearing 600 may be rotated on the driveshaft 200 as necessary to align the tabs 604 on the bearing 600 to the gaps 1300 between the split-ring shells 700A, 700B. The bearing 600 may be slid toward the split-ring shells 700 until the tabs 604 are positioned in the gaps 1300 between the split-ring shells 700 as shown in FIG. 14. The bearing 204 may be torqued to the bearing 600 by sliding the bearing 204 along the driveshaft 200 toward the bearing 600 and mating or otherwise engaging the threading 804 on the bearing 204 with the threading 608 on the bearing 600 to clamp the bearings 204, 600 to the driveshaft 200 as shown in FIG. 15. Torquing the bearing 204 to the bearing 600 may prevent the axial and rotational movement of the bearing 204 separate from the driveshaft 200.

Figure 16:
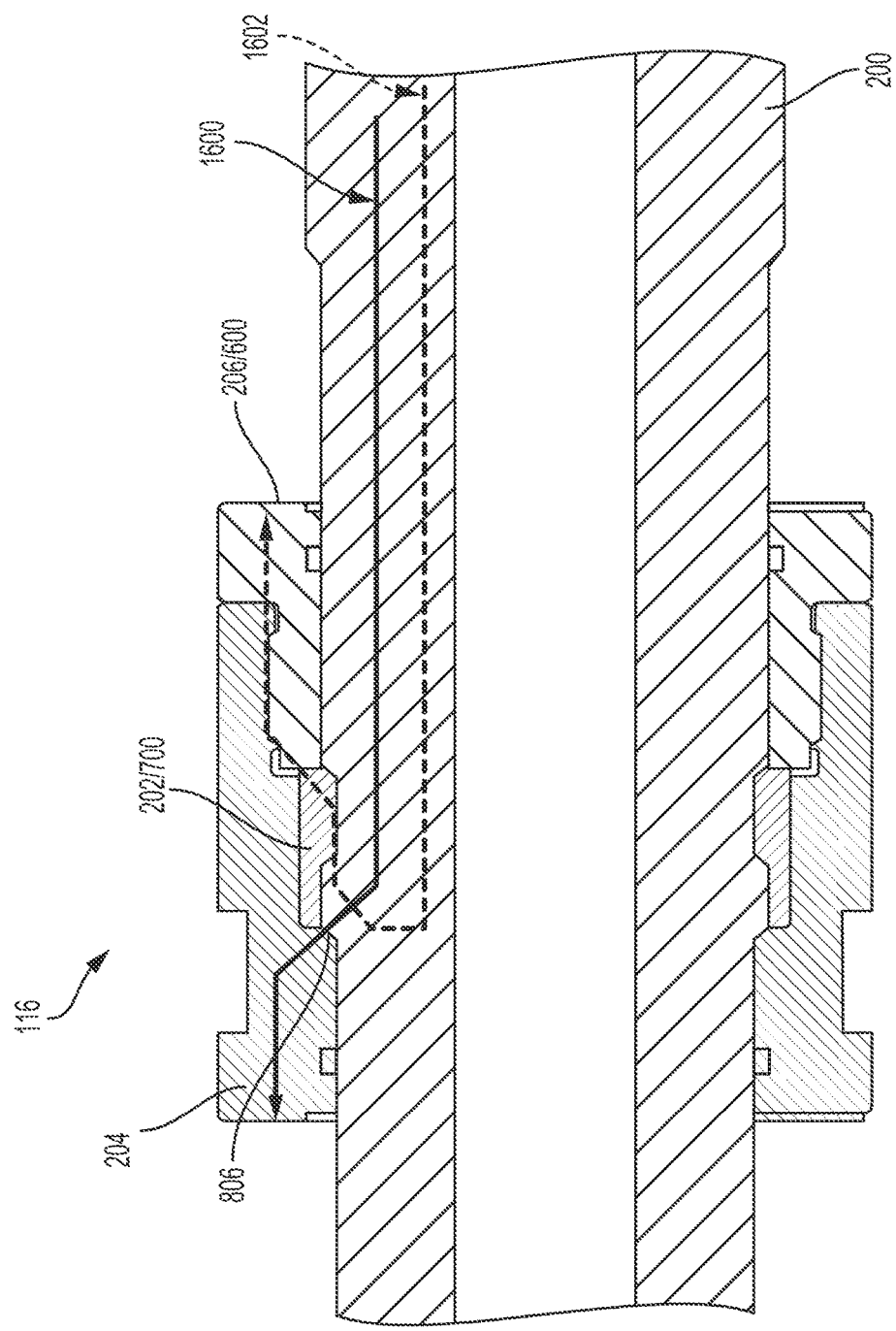
FIG. 16 is a cross-sectional view of a clamping assembly showing examples of axial load paths according to one aspect of the present disclosure.

FIG. 16 illustrates examples of load paths that may be transmitted to the bearings 204, 206/600 of the clamping assembly 116. In some aspects, bearing 204 may include on-bottom thrust bearings and bearing 206/600 may include off-bottom thrust bearings. Load path 1600, represented by the solid line, may represent the path of the on-bottom thrust load from the driveshaft 200 to the on-bottom thrust bearing (e.g., bearings 204) during on-bottom operation of the drilling system 100 of FIG. 1. The axial load during on-bottom operations may be transmitted from the driveshaft 200 into the on-bottom thrust bearing through the taper 806. Load path 1602, represented by the dashed line, may represent the path of the off-bottom thrust load from the driveshaft 200 to the off-bottom thrust bearing (e.g., bearing 206/600) during off-bottom operation of the drilling system 100. The axial load during off-bottom operations may be transmitted from the driveshaft 200 through the split-ring device 202 to the off-bottom thrust bearing. The clamping assembly 116 may securely couple the drilling components to the driveshaft 200 to withstand the axial loads transmitted from the driveshaft 200 during operation of the drilling system 100.

The driveshaft components may be coupled through mating male and female sub-components. For example, the bearing 206 shown in FIG. 4 includes cavities 404 for mating with the tabs 504 of the split-ring shells 500 shown in FIG. 5, and the driveshaft 200 shown in FIG. 3 includes grooves 306 for mating with the protrusions 508, 704 of the split-ring shells 500, 700 shown in FIGS. 5 and 7, respectively. In some aspects, the male and female sub-components may be interchanged to couple the driveshaft components in the same interlocking manner. For example, the bearing 206 may alternatively include tabs for mating with cavities in the split-ring shell 500 and the interior radial surface 506, 702 of the split-ring shells 500, 700 may include indentions or grooves for mating with the radial protrusions 300 of the driveshaft 200 to prevent axial and rotational movement of the split-ring device 202 and the bearing 206 separate from the driveshaft 200. Similarly, the position of corresponding sub-components may be variable to couple the driveshaft components in the same interlocking manner without departing from the scope of the present disclosure.

In some aspects, driveshaft assemblies may be provided according to one or more of the following examples:

Example #1

An assembly may include a driveshaft having radial protrusions. The radial protrusions may be positioned on the driveshaft to create grooves between the radial protrusions and a shoulder of the driveshaft. The assembly may also include a split-ring device having an axial end having one or more end tabs. The split-ring device may also have an interior radial surface having one or more protrusions corresponding to the grooves on the driveshaft. The assembly may also include a first driveshaft bearing having one or more axial cavities corresponding to the one or more end tabs for coupling the split-ring device to the first driveshaft bearing. The assembly may also include a second driveshaft bearing having threading for engaging corresponding threading on the first driveshaft bearing to couple the second driveshaft bearing to the first driveshaft bearing.

Example #2

The assembly of Example #1 may feature the threading of the second driveshaft bearing being positioned on an internal surface of the second driveshaft bearing. The corresponding threading of the first driveshaft bearing may be positioned on an external surface of the first driveshaft bearing to mate with the threading of the second driveshaft bearing.

Example #3

The assembly of Examples #1-2 may feature the split-ring device having two or more split-ring shells including an inner diameter sized to form a ring around an outer surface of the driveshaft.

Example #4

The assembly of Examples #1-3 may feature the grooves being sized to receive the one or more protrusions of the split-ring device and being positionable between a first edge of the radial protrusions and the shoulder of the driveshaft. The second driveshaft bearing may further include a taper on an internal surface of the second driveshaft bearing positionable axially adjacent to an opposing edge of the radial protrusions.

Example #5

The assembly of Examples #1-4 may feature the one or more protrusions of the split-ring device being positioned in the grooves of the driveshaft to prevent axial and rotational movement of the split-ring device relative to the driveshaft. The one or more end tabs of the split-ring device may be positioned in the one or more axial cavities of the first driveshaft bearing to prevent rotational movement of the first driveshaft bearing relative to the driveshaft. The second driveshaft bearing may be threadably coupled to the first driveshaft bearing to clamp the first driveshaft bearing and the second driveshaft bearing to the driveshaft.

Example #6

The assembly of Examples #1-5 may feature the first driveshaft bearing including an off-bottom thrust bearing and the second driveshaft bearing including an on-bottom thrust bearing.

Example #7

The assembly of Examples #1-6 may feature the split-ring device being positioned in the grooves between an edge of the radial protrusions and the off-bottom thrust bearing to receive an axial load from the driveshaft and transmit the axial load to the off-bottom thrust bearing during off-bottom operation of the driveshaft.

Example #8

The assembly of Example #6 may feature the on-bottom thrust bearing including a tapered edge positioned axially adjacent to an edge of the radial protrusions to receive an axial load from the driveshaft during on-bottom operation of the driveshaft.

Example #9

A clamping assembly may include a split-ring device having one or more protrusions on an interior radial surface of the split-ring device for engaging a driveshaft. The split-ring device may have an inner diameter sized to create one or more gaps in the split-ring device when positioned around the driveshaft. The clamping assembly may also include a first driveshaft bearing having one or more axial tabs positionable in the one or more gaps. The clamping assembly may also include a second driveshaft bearing having threading for engaging corresponding threading on the first driveshaft bearing to couple the second driveshaft bearing to the first driveshaft bearing.

Example #10

The clamping assembly of Example #9 may feature the threading of the second driveshaft bearing being positioned on an internal surface of the second driveshaft bearing. The corresponding threading of the first driveshaft bearing may be positioned on an external surface of the first driveshaft bearing to mate with the threading of the second driveshaft bearing.

Example #11

The clamping assembly of Examples #9-10 may feature the split-ring device including at least two split-ring shells. The one or more gaps may be between the at least two split-ring shells. The one or more gaps may be sized to receive the one or more axial tabs.

Example #12

The clamping assembly of Examples #9-11 may feature the second driveshaft bearing further including a taper on an internal surface of the second driveshaft bearing positionable axially adjacent to one or more radial protrusions on the driveshaft.

Example #13

The clamping assembly of Examples #9-12 may feature the one or more protrusions of the split-ring device being positioned in one or more grooves of the driveshaft to prevent axial and rotational movement of the split-ring device relative to the driveshaft. The one or more axial tabs of the first driveshaft bearing may be positionable in the one or more gaps in the split-ring device to prevent rotational movement of the first driveshaft bearing relative to the driveshaft. The second driveshaft bearing may be threadably coupled to the first driveshaft bearing to clamp the first driveshaft bearing and the second driveshaft bearing to the driveshaft.

Example #14

The clamping assembly of Examples #9-13 may further include the driveshaft having one or more grooves sized to receive the one or more protrusions of the split-ring device.

Example #15

The clamping assembly of Example #14 may feature the driveshaft includes one or more radial protrusions and a shoulder. The one or more grooves may be positioned between the one or more radial protrusions and the shoulder.

Example #16

The clamping assembly of Example #14 may feature the first driveshaft bearing including an off-bottom thrust bearing. The split-ring device may be positioned in the one or more grooves to receive an axial load from the driveshaft and transmit the axial load to the off-bottom thrust bearing during off-bottom operation of the driveshaft.

Example #17

The clamping assembly of Example #14 may feature the second driveshaft bearing including an on-bottom thrust bearing. The on-bottom thrust bearing may include a tapered edge positioned axially adjacent to an edge of the one or more protrusions to receive an axial load from the driveshaft during on-bottom operation of the driveshaft.

Example #18

A method for mounting components to a driveshaft may include positioning a first driveshaft component on the driveshaft proximate to a groove of the driveshaft. The groove may be located on the driveshaft between a driveshaft shoulder and a radial protrusion on the driveshaft. The method may also include positioning a protrusion of a split-ring device in the groove of the driveshaft. The method may also include coupling the first driveshaft component to the split-ring device by sliding the first driveshaft component axially toward the split-ring device to slidably interlock the first driveshaft component and the split-ring device. The method may also include threadably coupling a second driveshaft component to the first driveshaft component to axially and rotationally lock the split-ring device, the first driveshaft component, and the second driveshaft component to the driveshaft.

Example #19

The method of Example #18 may feature coupling the first driveshaft component to the split-ring device to include slidably coupling the first driveshaft component and the split-ring device by positioning axial tabs on the split-ring device into corresponding cavities on the first driveshaft component.

Example #20

The method of Example #18 may feature coupling the first driveshaft component to the split-ring device to include slidably coupling the first driveshaft component and the split-ring device by positioning axial tabs on the first driveshaft component into gaps in the split-ring device.

The foregoing description of the examples, including illustrated examples, has been presented only for the purpose of illustration and description and is not intended to be exhaustive or to limit the subject matter to the precise forms disclosed. Numerous modifications, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:
1. An assembly, comprising:
a driveshaft including radial protrusions, the radial protrusions positioned on the driveshaft to create grooves between the radial protrusions and a shoulder of the driveshaft;
a split-ring device including:
an axial end having one or more end tabs; and
an interior radial surface having one or more protrusions corresponding to the grooves on the driveshaft;
a first driveshaft bearing including one or more axial cavities corresponding to the one or more end tabs for coupling the split-ring device to the first driveshaft bearing; and
a second driveshaft bearing including threading for engaging corresponding threading on the first driveshaft bearing to couple the second driveshaft bearing to the first driveshaft bearing.
2. The assembly of claim 1, wherein the threading of the second driveshaft bearing is positioned on an internal surface of the second driveshaft bearing, wherein the corresponding threading of the first driveshaft bearing is positioned on an external surface of the first driveshaft bearing to mate with the threading of the second driveshaft bearing.
3. The assembly of claim 1, wherein the split-ring device includes two or more split-ring shells having an inner diameter sized to form a ring around an outer surface of the driveshaft.
4. The assembly of claim 1, wherein the grooves are sized to receive the one or more protrusions of the split-ring device and are positionable between a first edge of the radial protrusions and the shoulder of the driveshaft,
wherein the second driveshaft bearing further includes a taper on an internal surface of the second driveshaft bearing positionable axially adjacent to an opposing edge of the radial protrusions.
5. The assembly of claim 1, wherein the one or more protrusions of the split-ring device are positioned in the grooves of the driveshaft to prevent axial and rotational movement of the split-ring device relative to the driveshaft,
wherein the one or more end tabs of the split-ring device are positioned in the one or more axial cavities of the first driveshaft bearing to prevent rotational movement of the first driveshaft bearing relative to the driveshaft,
wherein the second driveshaft bearing is threadably coupled to the first driveshaft bearing to clamp the first driveshaft bearing and the second driveshaft bearing to the driveshaft.
6. The assembly of claim 1, wherein the first driveshaft bearing comprises an off-bottom thrust bearing and the second driveshaft bearing comprises an on-bottom thrust bearing.
7. The assembly of claim 6, wherein the split-ring device is positioned in the grooves between an edge of the radial protrusions and the off-bottom thrust bearing to receive an axial load from the driveshaft and transmit the axial load to the off-bottom thrust bearing during off-bottom operation of the driveshaft.
8. The assembly of claim 6, wherein the on-bottom thrust bearing includes a tapered edge positioned axially adjacent to an edge of the radial protrusions to receive an axial load from the driveshaft during on-bottom operation of the driveshaft.
9. A clamping assembly, comprising:
a split-ring device including one or more protrusions on an interior radial surface of the split-ring device for engaging a driveshaft, the split-ring device having an inner diameter sized to create one or more gaps in the split-ring device when positioned around the driveshaft;
a first driveshaft bearing including one or more axial tabs positionable in the one or more gaps; and
a second driveshaft bearing including threading for engaging corresponding threading on the first driveshaft bearing to couple the second driveshaft bearing to the first driveshaft bearing.
10. The clamping assembly of claim 9, wherein the threading of the second driveshaft bearing is positioned on an internal surface of the second driveshaft bearing, wherein the corresponding threading of the first driveshaft bearing is positioned on an external surface of the first driveshaft bearing to mate with the threading of the second driveshaft bearing.
11. The clamping assembly of claim 9, wherein the split-ring device includes at least two split-ring shells, wherein the one or more gaps are between the at least two split-ring shells, the one or more gaps being sized to receive the one or more axial tabs.
12. The clamping assembly of claim 11, wherein the second driveshaft bearing further includes a taper on an internal surface of the second driveshaft bearing positionable axially adjacent to one or more radial protrusions on the driveshaft.

13. The clamping assembly of claim 9, wherein the one or more protrusions of the split-ring device are positioned in one or more grooves of the driveshaft to prevent axial and rotational movement of the split-ring device relative to the driveshaft,
   wherein the one or more axial tabs of the first driveshaft bearing are positionable in the one or more gaps in the split-ring device to prevent rotational movement of the first driveshaft bearing relative to the driveshaft,
   wherein the second driveshaft bearing is threadably coupled to the first driveshaft bearing to clamp the first driveshaft bearing and the second driveshaft bearing to the driveshaft.

14. The clamping assembly of claim 9, further comprising the driveshaft including one or more grooves sized to receive the one or more protrusions of the split-ring device.

15. The clamping assembly of claim 14, wherein the driveshaft includes one or more radial protrusions and a shoulder, wherein the one or more grooves are positioned between the one or more radial protrusions and the shoulder.

16. The clamping assembly of claim 14, wherein the first driveshaft bearing comprises an off-bottom thrust bearing, wherein the split-ring device is positioned in the one or more grooves to receive an axial load from the driveshaft and transmit the axial load to the off-bottom thrust bearing during off-bottom operation of the driveshaft.

17. The clamping assembly of claim 14, wherein the second driveshaft bearing comprises an on-bottom thrust bearing, wherein the on-bottom thrust bearing includes a tapered edge positioned axially adjacent to an edge of the one or more protrusions to receive an axial load from the driveshaft during on-bottom operation of the driveshaft.

18. A method for mounting components to a driveshaft, comprising:
   positioning a first driveshaft component on the driveshaft proximate to a groove of the driveshaft, the groove being located on the driveshaft between a driveshaft shoulder and a radial protrusion on the driveshaft;
   positioning a protrusion of a split-ring device in the groove of the driveshaft,
   coupling the first driveshaft component to the split-ring device by sliding the first driveshaft component axially toward the split-ring device to slidably interlock the first driveshaft component and the split-ring device; and
   threadably coupling a second driveshaft component to the first driveshaft component to axially and rotationally lock the split-ring device, the first driveshaft component, and the second driveshaft component to the driveshaft.

19. The method of claim 18, wherein coupling the first driveshaft component to the split-ring device includes slidably coupling the first driveshaft component and the split-ring device by positioning axial tabs on the split-ring device into corresponding cavities on the first driveshaft component.

20. The method of claim 18, wherein coupling the first driveshaft component to the split-ring device includes slidably coupling the first driveshaft component and the split-ring device by positioning axial tabs on the first driveshaft component into gaps in the split-ring device.

* * * * *